US009648362B2

(12) United States Patent
Amidei et al.

(10) Patent No.: US 9,648,362 B2
(45) Date of Patent: *May 9, 2017

(54) SYNCHRONIZING MULTIPLE OVER THE TOP STREAMING CLIENTS

(71) Applicant: Sonic IP, Inc., San Diego, CA (US)

(72) Inventors: William David Amidei, San Diego, CA (US); Jason Braness, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,695

(22) Filed: Jun. 24, 2016

(65) Prior Publication Data

US 2016/0309206 A1  Oct. 20, 2016

Related U.S. Application Data

(63) Continuation of application No. 13/906,952, filed on May 31, 2013, now Pat. No. 9,380,099.

(51) Int. Cl.
*H04N 21/242* (2011.01)
*H04N 21/2387* (2011.01)
(Continued)

(52) U.S. Cl.
CPC ........... *H04N 21/2387* (2013.01); *H04L 7/00* (2013.01); *H04L 7/0008* (2013.01);
(Continued)

(58) Field of Classification Search
CPC ............... H04N 21/21805; H04N 5/76; H04N 21/4307; H04N 21/242; H04N 21/4305;
(Continued)

(56) References Cited

U.S. PATENT DOCUMENTS 7,996,700 B2   8/2011   Celinski et al.
9,380,099 B2   6/2016   Amidei et al.
(Continued)

FOREIGN PATENT DOCUMENTS

EP   2290899 A2   3/2011
WO   2014194232 A1   12/2014

OTHER PUBLICATIONS

International Preliminary Report on Patentability for International Application PCT/US2014/040299, Report issued Dec. 1, 2015, Mailed Dec. 10, 2015, 06 Pgs.
(Continued)

*Primary Examiner* — Le H Luu
(74) *Attorney, Agent, or Firm* — KPPB LLP

(57) ABSTRACT

Systems and methods for synchronizing the playback of OTT or other time sensitive content on multiple playback devices is disclosed. The systems and methods include receiving time information based on a network time source in the playback devices. The playback clock in each playback device is set based upon the time information. Stream initiation information derived using the time information from the network time source is received by each of the playback device from the media provider. The playback devices use the stream initiation information to adjust the presentation time stamps of the frames of the media content in the stream.

13 Claims, 7 Drawing Sheets

(51) Int. Cl.
*H04L 29/06* (2006.01)
*H04L 7/00* (2006.01)
*H04N 21/43* (2011.01)

(52) U.S. Cl.
CPC ........ *H04L 65/4069* (2013.01); *H04L 65/604* (2013.01); *H04L 65/607* (2013.01); *H04L 65/80* (2013.01); *H04N 21/242* (2013.01); *H04N 21/4305* (2013.01); *H04N 21/4307* (2013.01)

(58) Field of Classification Search
CPC ........ H04W 56/001; G06F 1/12; G06F 3/165; H04L 7/00; H04L 7/0008
See application file for complete search history.

(56) References Cited

U.S. PATENT DOCUMENTS

| | | | |
|---|---|---|---|
| 2006/0002681 A1* | 1/2006 | Spilo | H04N 5/76 386/220 |
| 2008/0270800 A1 | 10/2008 | Krober | |
| 2009/0129752 A1 | 5/2009 | Yamada et al. | |
| 2010/0100917 A1 | 4/2010 | Chiao | |
| 2010/0111491 A1 | 5/2010 | Kamoto | |
| 2011/0047247 A1* | 2/2011 | Katz | G11B 27/10 709/219 |
| 2011/0276648 A1* | 11/2011 | Soldan | G06F 1/12 709/208 |
| 2012/0144435 A1 | 6/2012 | Spilo et al. | |
| 2013/0128116 A1* | 5/2013 | Knowles | H04W 56/001 348/521 |
| 2014/0237086 A1* | 8/2014 | Legallais | H04N 21/21805 709/219 |
| 2014/0359075 A1 | 12/2014 | Amidei et al. | |

OTHER PUBLICATIONS

International Search Report and Written Opinion for International Application PCT/US2014/040299, report completed Sep. 8, 2014, Mailed Oct. 6, 2014, 7 Pgs.
"MPEG-2, Part 1, ISO/IEC 13818-1", Information technology—Generic Coding of Moving Pictures and Associated Audio: Systems, 161 pgs., Nov. 13, 1994.
"MPEG-4, Part 14, ISO/IEC 14496-14", Information technology—Coding of audio-visual objects, 18 pgs., Nov. 15, 2003.
Fielding et al., "Hypertext Transfer Protocol—HTTP1.1", Network Working Group, Jun. 1999, 114 pgs, Jun. 1999, 114 Pages.
Schulzrinne, H. et al., "Real Time Streaming Protocol (RTSP)", Internet Engineering Task Force, RFC 2326, Apr. 1998, 80 pgs.
Extended European Search Report for European Application No. 14805026.3, Search completed Dec. 20, 2016, Mailed Jan. 3, 2017, 9 Pgs.

* cited by examiner

SYNCHRONIZING MULTIPLE OVER THE TOP STREAMING CLIENTS

CROSS-REFERENCE TO RELATED APPLICATIONS

This application is a continuation of U.S. application Ser. No. 13/906,952, entitled "Synchronizing Multiple Over the Top Streaming Clients", filed May 31, 2013, the disclosure of which is incorporated by reference herein in its entirety.

FIELD OF THE INVENTION

This invention relates to the playback of streamed media content by multiple playback devices. More particularly, this invention relates to synchronizing the playback of media content by multiple playback devices of Over The Top (OTT) or other presentation time sensitive media streamed over a network.

BACKGROUND OF THE INVENTION

The term streaming media describes the playback of media on a playback device, where the media is stored on a server and continuously sent to the playback device over a network during playback. For purposes of this discussion, media and/or encoded media are defined as data of a work that includes video, audio, pictures, or another type of presentation that may be displayed, played or in some other way presented by a playback device. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

Adaptive bitrate streaming performs adequately for playback of media content on a device. However, there is currently no viable way to synchronize the playback of streamed content on two or more playback devices such that there is no discernible difference between the presentation times of the content on the two or more devices. Currently, the only way to synchronize the device is for the user to manually control the start and stop of the playback on each of the devices to synchronize the playback which is often impossible or at least very difficult to achieve. Furthermore, the streaming of Over The Top (OTT) content or other presentation time sensitive content using adaptive bit rate streaming and other streaming processes is becoming more prevalent. OTT content is content that a media content provider delivers but may not have any control of the content and can only provide the content as it is received. The best example of OTT content is a live broadcast. During a live broadcast, the content is streamed directly to the playback devices to be played shortly after it is received in real time. Due to differences in the capabilities of playback devices and the network connections of the devices, the timing of receipt and playback of the streamed content on different devices may not be synchronized. As such, the manual synchronization is even more difficult than it is for synchronizing the playback of stored content on playback devices.

The lack of synchronization may be a problem when one or more devices are performing the playback within close proximity of one another as the lack of synchronization may be noticeable by viewers. For example, two or more playback devices may be set up in a restaurant to view a live sporting event. If the playback is not synchronized, the user may notice the broadcast delay between devices.

SUMMARY OF THE INVENTION

Systems and methods for synchronizing the playback of streamed OTT content or other time sensitive content in accordance with embodiments of this invention are disclosed. In accordance with embodiments of this invention, a method for playback of encoded media performed by a playback device be performed by the following actions. The playback device transmits a request to a network time provider. In response to the request, the playback device receives the time information from the network time provider. The playback device sets a playback clock in the device using the received time information. In order to provide a playback of a stream of content, the playback device receives stream initiation information for the stream of encoded media from a stream media provider. The stream initiation information includes a stream start time. The playback device then receives the stream of encoded media. The stream includes frames of the encoded content. The presentation time information of each of the frames of the stream is adjusted in the playback device based upon the stream initiation information.

In accordance with some embodiments of this invention the network time provider is a Network Time Protocol Server and the transmitting of the request and receiving of the time information are performed using Network Time Protocol (NTP). Furthermore, the time information and/or the start time is provided in Coordinated Universal Time in accordance with some embodiments this invention.

In accordance with some other embodiments of this invention, the network time provider is a local time server. In accordance with some of these embodiments, the local time server performs the following process to obtain time information. The local time server transmits a request for time information to a Network Time Protocol server. In response to the request, the local time server, receives the time information from the Network Time Protocol server in the local time server. The local time server then may receive the request for time information from the playback device. The local time server then generates the time information for the playback device from the timing information received from the Network Time Protocol server and transmits the time information to the playback device.

DETAILED DISCLOSURE OF THE INVENTION

Turning now to the drawings, systems and methods for synchronizing playback of OTT content by multiple clients is provided. In particular, embodiments of this invention can use time information from a common source to set the playback clocks in the individual playback devices. The playback devices then receive start time information from a media content provider that indicate the time for the start of playback. The start time information is determined using the time information from the common source. Each device then adjusts the presentation time stamps of the frames in the received content based on the received start time information.

Streaming System Architecture

Figure 1:
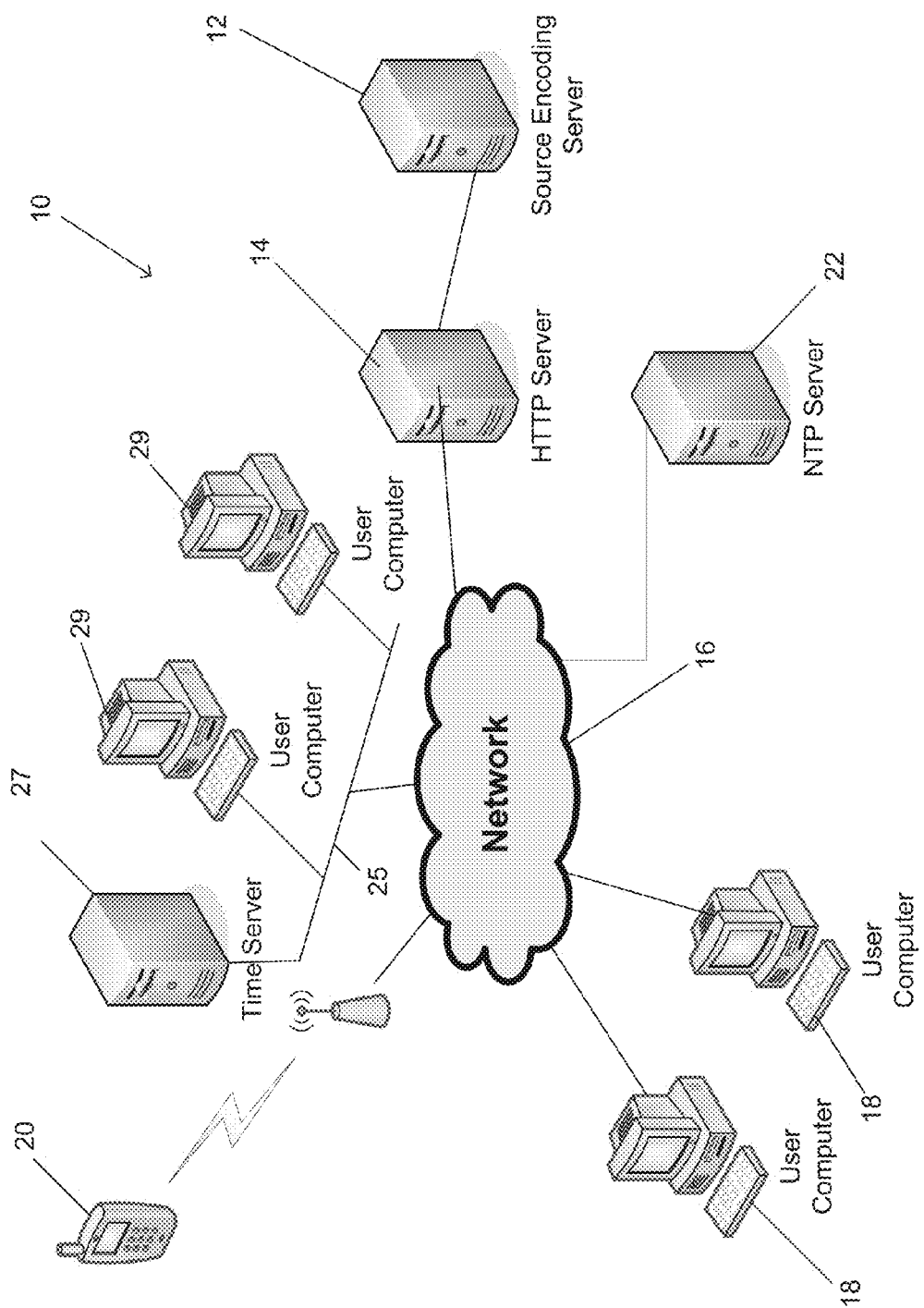
FIG. 1 illustrates a network diagram of a media streaming system in accordance with an embodiment of the invention.

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

Time server 22 is a server that provides Coordinated Universal Time (UTC) or equivalent information. In the shown embodiment, the time server 22 is a Network Time Protocol (NTP) server or an equivalent system that may be maintained by a third party. The use of NTP allows the time server 22 to provide time information to the devices allow internal clocks in the individual devices that are set using the time information to be synchronized within tens (10s) of milliseconds (ms) of one another.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

As illustrated, some playback devices, such as user computers 29, are connected to the network 16 via a Local Area Network (LAN) 25. LAN 25 may include a local time server 27. Local time server 27 receives time information from the NTP server 22 and generates local time information based upon the time information received from the NTP server 22. Although shown as a server, one skilled in the art will recognize that any device connected to LAN 25 that can provide time information may be used without departing from embodiments of this invention. The local time information of local time server 27 may be provided to the playback devices connected to the LAN 25 to ensure that better time synchronization between the connected devices. The use of local time server 27 connected to the LAN 25 may be used when a synchronization of less than the 10s of ms achieved using network time server 22 is desired. Network time servers, playback devices, and local time servers in accordance with embodiments of the invention are discussed further below.

Playback Device

Figure 2:
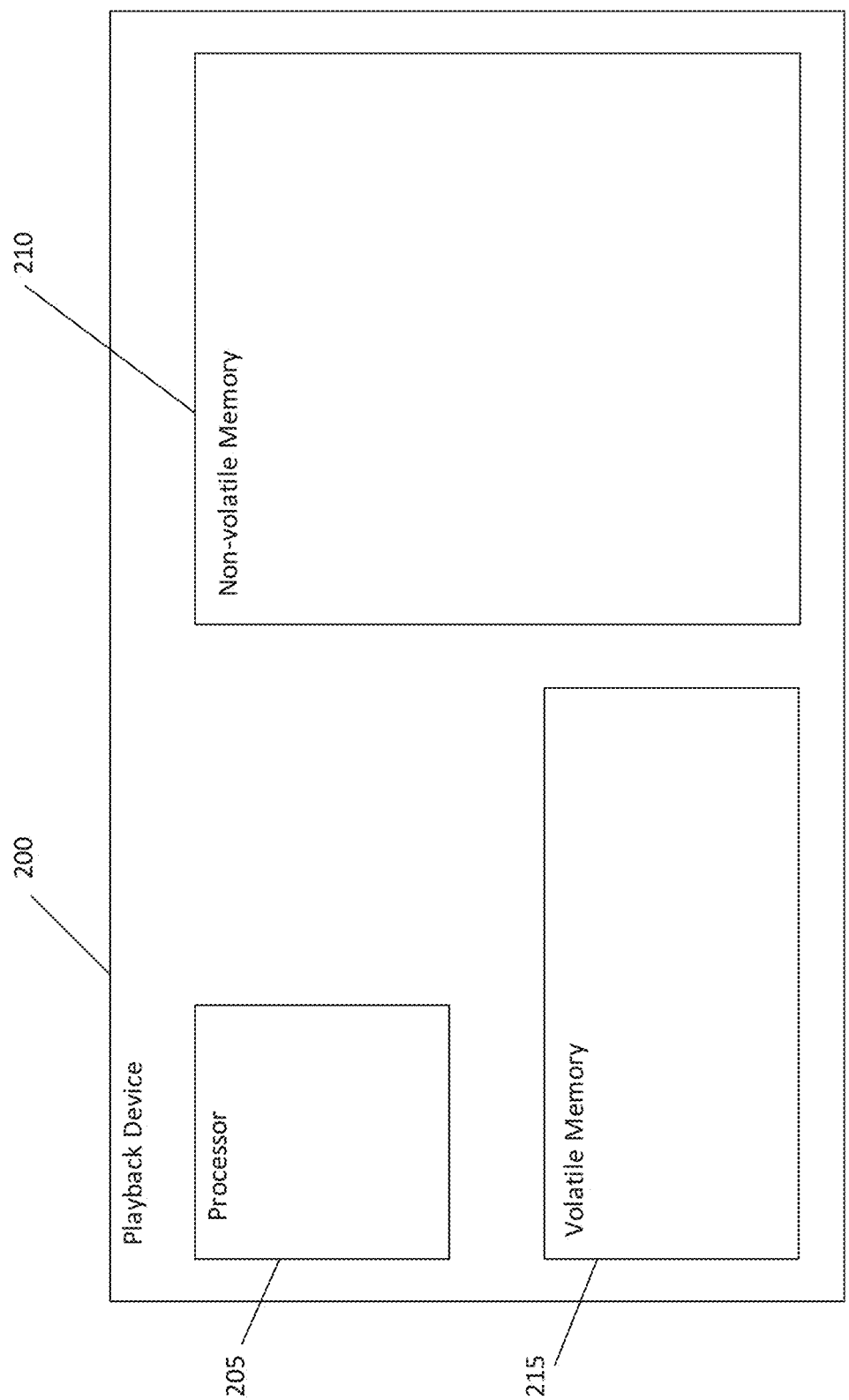
FIG. 2 illustrates a block diagram of components of a playback device that performs processes for providing systems and methods in accordance with an embodiment of this invention.

Some processes for providing methods and systems in accordance with embodiments of this invention are executed by a playback device. The relevant components in a playback device that can perform the processes in accordance with an embodiment of the invention are shown in FIG. 2. One skilled in the art will recognize that playback device may include other components that are omitted for brevity without departing from this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of non-transitory computer readable media appropriate to a specific application.

Servers

Figure 3:
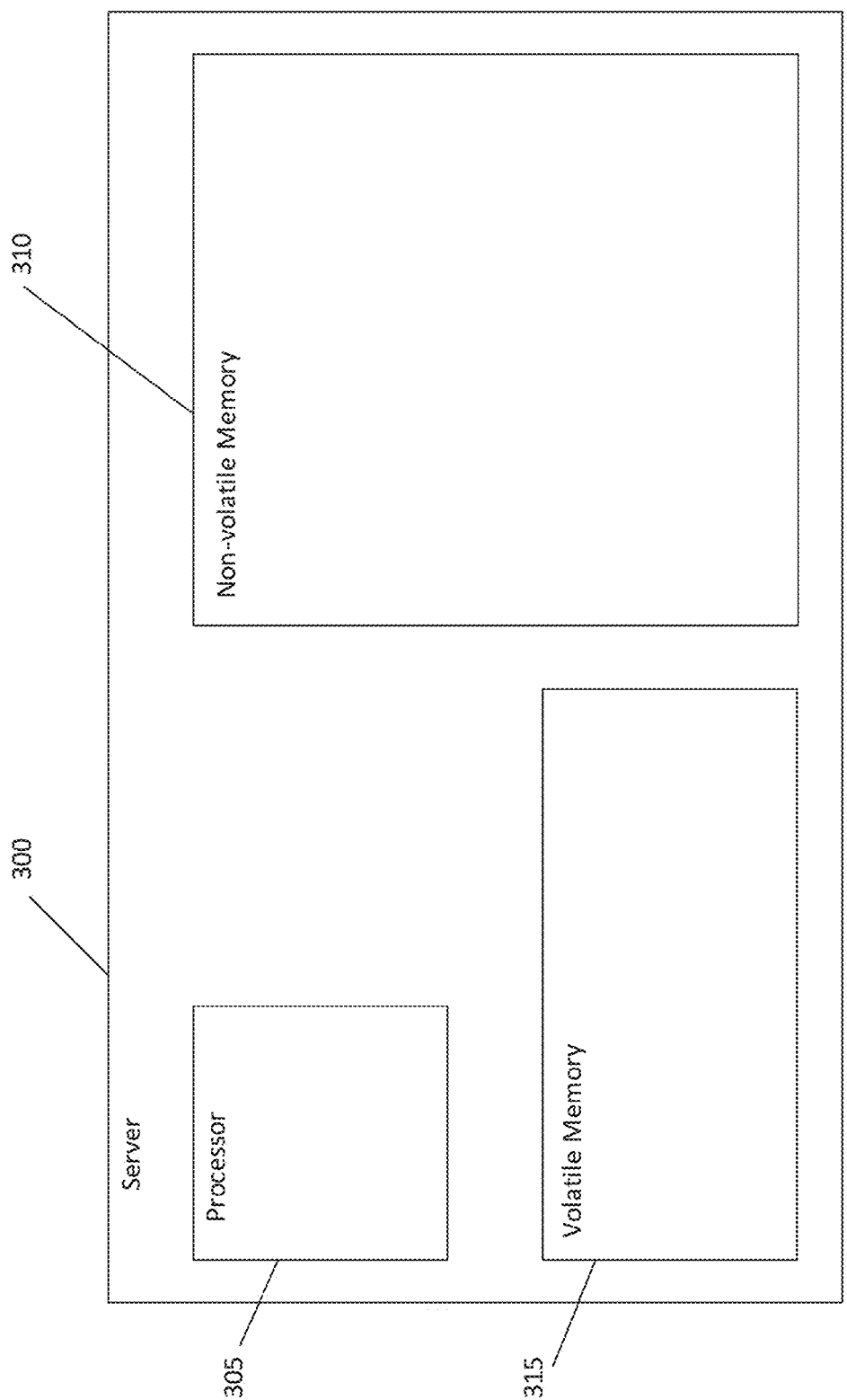
FIG. 3 illustrates a block diagram components of a server that performs processes for providing systems and methods in accordance with an embodiment of this invention.

Some processes for providing methods and systems in accordance with embodiments of this invention are executed by the HTTP server; source encoding server; and/or local and network time servers. The relevant components in a server that perform the processes in accordance with embodiments of the invention are shown in FIG. 3. One skilled in the art will recognize that a server may include other components that are omitted for brevity without departing from the embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In other embodiments, the server software and/or firmware can be stored in any of a variety of non-transitory computer readable media appropriate to a specific application. Although a specific server is illustrated in FIG. 3, any of a variety of server configured to perform any number of processes can be utilized in accordance with embodiments of the invention.

Playback Synchronization

In accordance with embodiments of this invention, playback devices obtain time information from a common source and use the time information to set the playback clock of the devices. The playback devices also receive playback time information from the stream content provider. The playback time information is then used to adjust the presentation time of frames in the stream based upon the playback clock. Since the playback clocks have been set based upon time information from a common source there should by less than 10s of ms delay between the presentations. A timing diagram of messages and information passed between devices over a network in accordance some embodiments of this invention is illustrated in FIG. 4.

Figure 4:
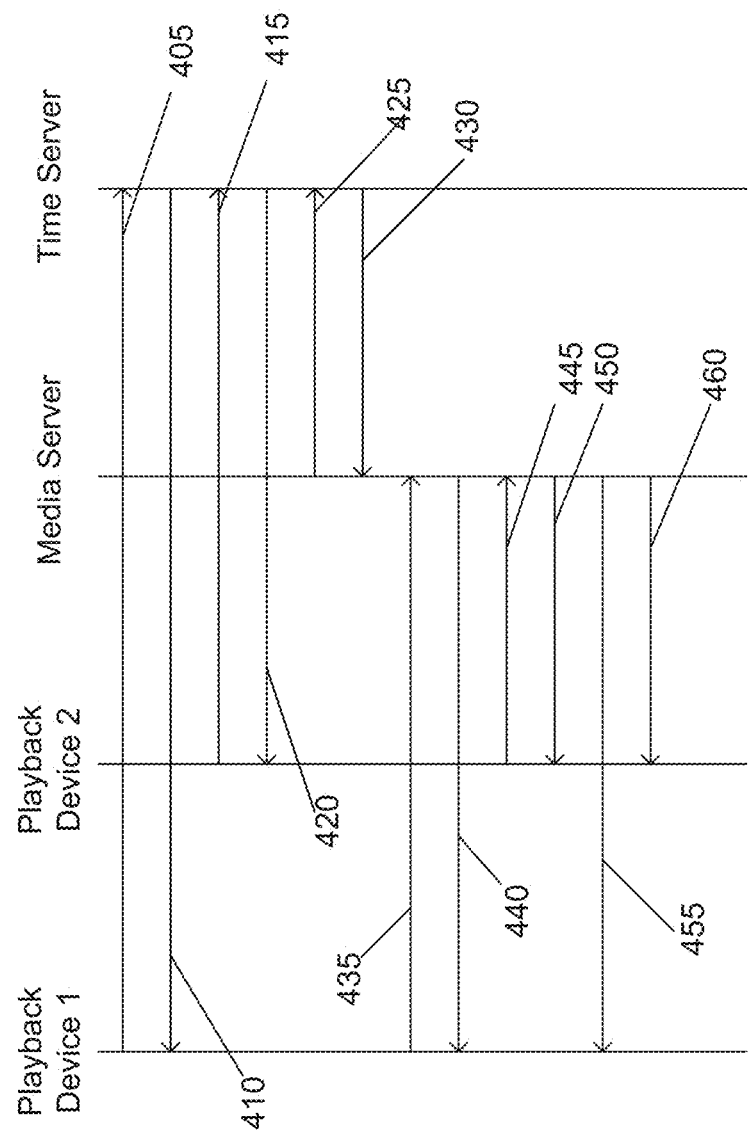
FIG. 4 illustrates a timing diagram of information transmitted between devices over a network in accordance with some embodiments of this invention.

In FIG. 4, the devices include a first playback device, a second playback device, a media server, and a network time server. The first and second playback devices are devices capable of presenting streamed encoded media content. The media server is a system that is providing the streamed content over the network to the first and second playback devices. The network time server is a time server that provides time information. In accordance with some embodiments, the time information is provided using NTP. Furthermore, the time information provides time information based upon Coordinated Universal Time (UTC).

In accordance with the timing diagram of FIG. 4, the first playback device transmits a request 405 to the time server for time information and receives time information 410 from the time server in response to the request. Likewise, the second playback device transmits a request 415 to the time server for time information and receives time information 420 from the time server in response to the request. Furthermore, the media server also transmits a time information request 425 to the time server and receives time information 430 from the time server in response to the request. In accordance with some embodiments, these exchanges are performed using NTP. However, other means for performing these exchanges of messages may be used without departing from embodiments of this invention. Furthermore, one skilled in the art will recognize that devices do not need to receive the time information from the same time server as long as the time information provided by the different time servers is generated from a common source. One skilled in the art will recognize that due to the network bandwidth and configuration of the networks connected to the devices that some delay may be introduced between the time information provided to the various devices by the time server.

The first and second playback devices use the time information received to set the respective playback clocks in each playback device. The first playback device transmits a request 435 for OTT content or other presentation time sensitive content to the media server. The media server transmits stream initiation information for a stream of encoded media for the desired content 440 to the first playback device. Similarly, the second device transmits a request 445 for the same OTT content or other presentation for time sensitive content to the media server. The media server transmits stream initiation information for a stream of encoded media for the desired content 450 to the second playback device. In accordance with some embodiments, the stream initiation information includes a start time based on the UTC.

The media server then commences transmitting streams of the media content 455 and 460 to each of the first and second playback devices. Each of the first and second devices then adjusts the Presentation Time Stamp (PTS) of each frame received in the stream of media content based upon stream initiation information. In accordance with some of these embodiments, the start time in the stream will be based upon the playback clock derived from UTC and the UTC of the start time. Since the start time of the stream is derived from the UTC and the playback clock is derived from the UTC, the delay between the presentations will be in the 10s of ms based on the difference of time information received by the various devices.

In some embodiments, it may be desirable to have the synchronization of playback of the content include less than 10s of ms of delay. This may be the case where devices are providing playback of the content in close proximity to one another. A timing diagram of a system that provides for greater synchronization between playback devices in accordance with some embodiments of this invention is shown in FIG. 5.

Figure 5:
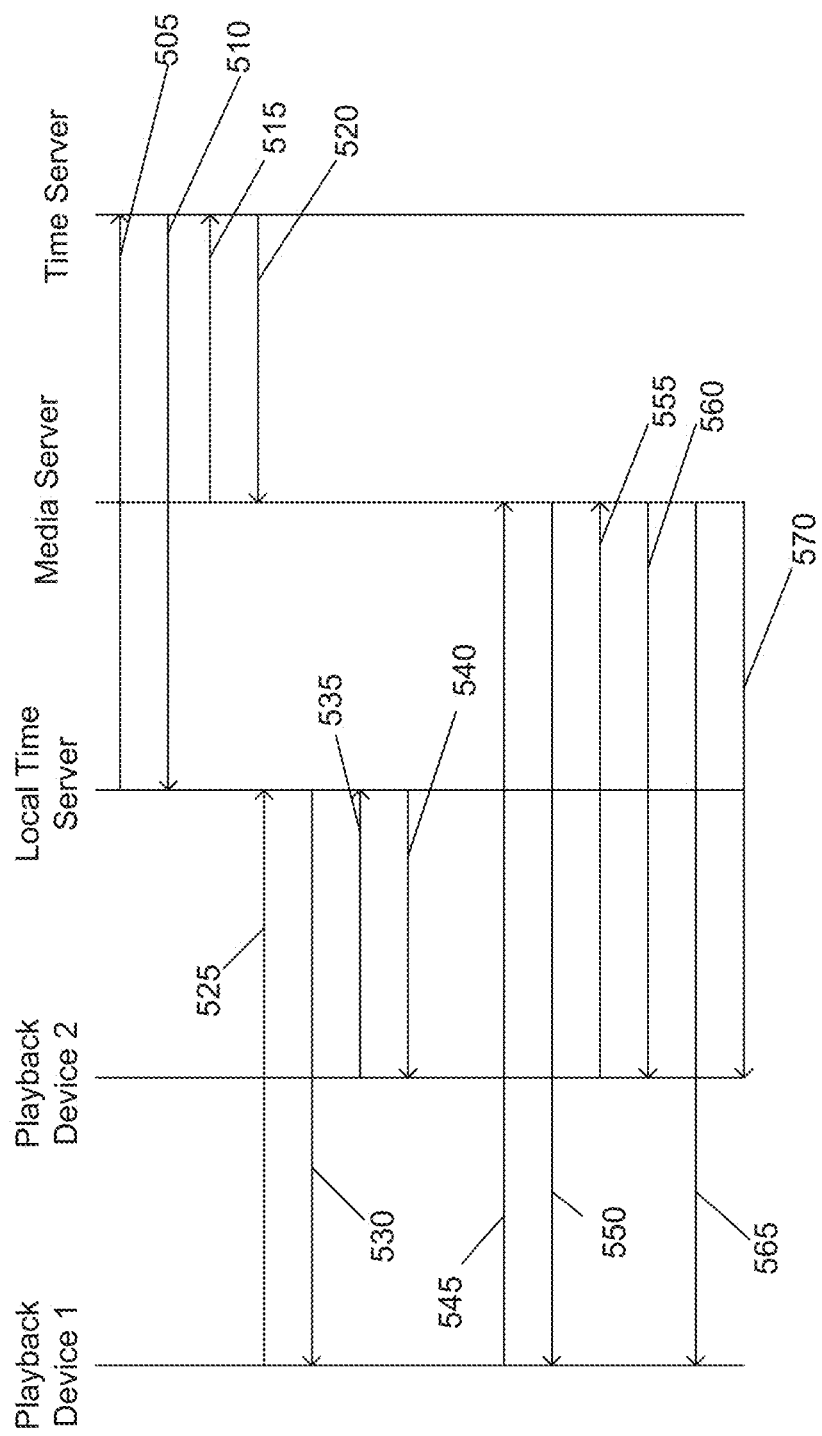
FIG. 5 illustrates a timing of information transmitted between devices over a network in accordance with other embodiments of this invention.

The system in FIG. 5 includes a first playback device, a second playback device, a local time server, a media server, and a network time server. The first and second playback devices are devices capable of presenting streamed encoded media content and each of these devices is connected to a LAN. The LAN includes a local time server. The local time server is a server that provides time information to devices connected to the LAN. In accordance with these embodiments, the time information is based upon time information received from a network time server as explained further below. The media server is a system that is providing the streamed content over the network to the first and second playback devices. The network time server is a time server that provides time information. In accordance with some embodiments, the time information is provided using NTP. Furthermore, the time information provides time information specified in terms of UTC.

In accordance with the timing diagram of FIG. 4, the local time server transmits a request 505 for time information to the network time server and receives the time information 510 from the time server in response. The media server also transmits a time information request 515 to the time server and receives time information 520 from the time server in response to the request. In accordance with some embodiments, these exchanges are performed using NTP. However, other means for performing these exchanges of messages may be used without departing from embodiments of this invention. Furthermore, one skilled in the art will recognize that servers do not need to receive the time information from the same time server as long as the time information provided by the different time servers is generated from a common source. One skilled in the art will also recognize that due to the network bandwidth and configuration of the networks connected to the servers that some delay may be introduced between the time information provided to the various devices by the time server.

The local time server then uses the time information to generate time information for use by the playback devices connected to the LAN. The first playback device transmits a request 525 to the local time server for time information and receives time information 530 from the local time server in response to the request. Likewise, the second playback device transmits a request 535 to the local time server for information and receives time information 540 from the local time server in response to the request. The first and second playback devices use the time information received to set the respective playback clocks in each device. As the time information is received over a LAN from the local server, there is less delay introduced into the time information. Thus, the playback clocks of the first and second playback devices will be more closely synchronized.

To start playback, the first device transmits a request 545 for OTT content or other presentation time sensitive content to the media server. The media server transmits stream initiation information for a stream of encoded media for the desired content 550 to the first playback device. Similarly, the second device transmits a request 555 for the same OTT content or other presentation for time sensitive content to the media server. The media server transmits stream initiation information for a stream of encoded media for the desired content 560 to the second playback device. In accordance with some embodiments, the stream initiation information includes a start time based on the UTC.

The media server then commences transmitting streams of the media content 565 and 570 to each of the first and second playback devices. Each of the first and second devices then adjusts the Presentation Time Stamp (PTS) of each frame received in the stream of media content based upon stream initiation information. In accordance with some of these embodiments, the start time in the stream will be based upon the playback clock derived from UTC information received from the local time server and the UTC of the start time. Since the start time of the stream is derived from the UTC and the playback clock is derived from the UTC received from the local time server instead of the network time server, the delay between the presentations will typically be less than the 10s of ms of the system described above in reference to FIG. 4. This is because the internal clocks of the individual playback devices are more closely synchronized due to the lack of latency between the individual playback devices and the local time server of the LAN.

Figure 6:
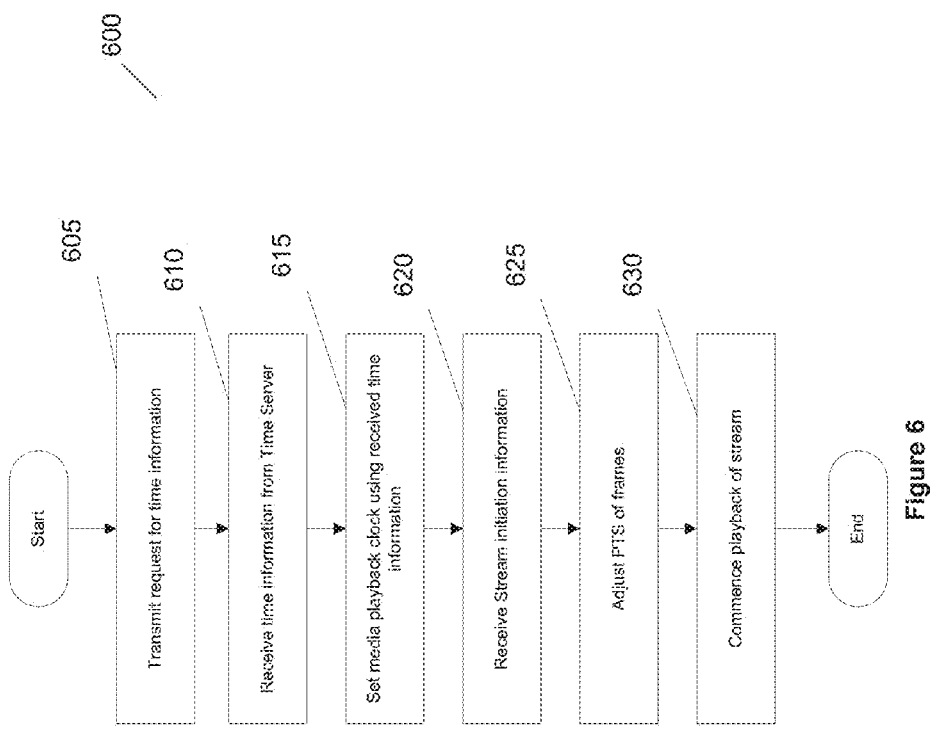
FIG. 6 illustrates a flow diagram of a process performed by a playback device in accordance with embodiments of this invention.

A process performed by a playback device to provide synchronized playback in accordance with some embodiments of this invention is illustrated in FIG. 6. The process 600 includes transmitting a request for time information to a time provider (605). As discussed with reference to FIGS. 4 and 5, the time provider may be, but is not limited to, a network time server and/or a local time server. The device receives time information from the time provider (610). The time information is preferably based upon the UTC. The time information is used by the playback device to set a media playback clock (615).

When the playback device plays back OTT or other presentation time content, the playback device receives stream initiation information (620). In accordance with some embodiments, the stream initiation information may be in the top level index of the requested content or provided along with some other type of administrative information such as metadata or the like. In accordance with some embodiments, the stream initiation information includes a start time based on the UTC. The playback device then receives the stream of media content. As the stream is received, the playback device adjusts the presentation time information of each frame based upon the stream initiation information and the playback clock (625). The presentation time information may be the Presentation Time Stamp (PTS) of a frame, PTS of a reference frame for a frame, or any other information that may be used to determine the time at which a frame may be presented. In accordance with some of these embodiments, the start time and the time of the playback clock are used to adjust the PTS of each frame. In particular, the difference between the start time received from the media server and the playback clock may be used to adjust the PTS of each frame. The playback of the stream then commences (630).

Figure 7:
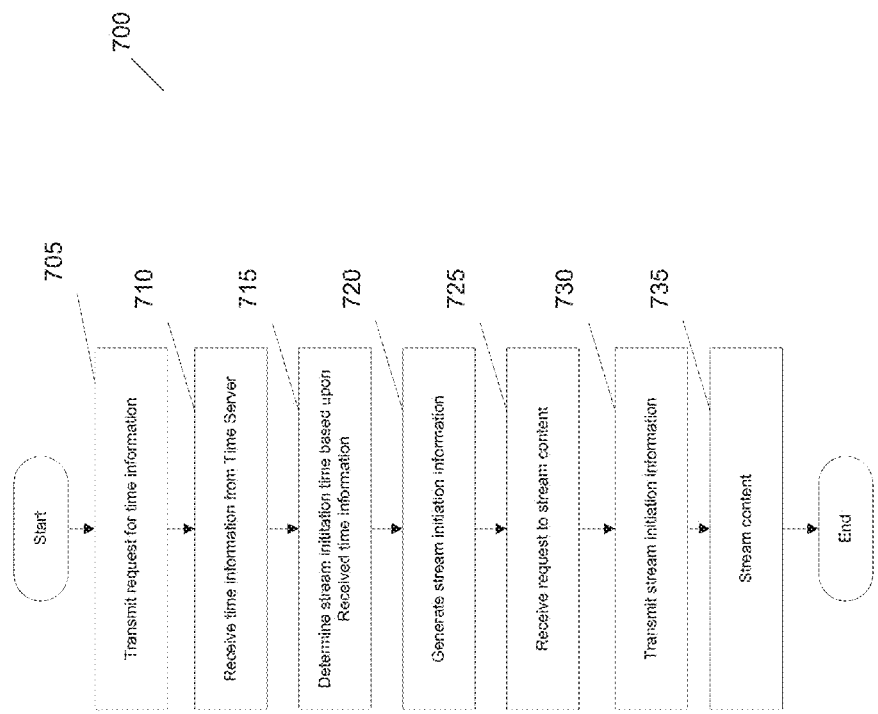
FIG. 7 illustrates a flow diagram of a process performed by a stream content provider in accordance with embodiments of this invention.

A process for providing stream initiation time information performed by a media server in accordance with embodiments of this invention is illustrated in FIG. 7. Process 700 includes transmitting a request for time information to a network time provider (705). As discussed with reference to FIGS. 4 and 5, the time provider may be, but is not limited to, a network time server. The media receives time information from the time provider (710). The time information is preferably based upon the UTC. The time information is used by the media server to determine a stream initiation time (715). As discussed above, the stream initiation time may be a start time that is based upon the UTC.

The stream initiation time is then used to generate stream initiation information for the stream of content (720). When a request for a stream of the content is received (725), the stream initiation information is provided to the requesting playback device (730) and the content is streamed to the playback device (735).

The above is description of embodiments of systems and methods in accordance with the present invention. It is foreseen that other skilled in the art will design alternative systems that infringe on this invention as set forth in the following claims either literally or through the Doctrine of Equivalents.

What is claimed is:

1. A method for playback of encoded media performed by a playback device comprising:
   transmitting a request for time information from each of a plurality of playback devices in a local network to a network time provider for the local network;
   receiving the time information from the network time provider in each of the plurality of playback devices;
   setting a playback clock in each of the plurality of playback devices using the received time information such that a time delay between the playback clocks in each of the plurality of playback devices in the local network is less than tens of milliseconds so that delay between the playback of the same media content on each of the plurality of playback devices in the local network is not noticeable by a human;
   receiving stream initiation information for a stream of encoded media from a stream media provider in the playback device wherein the stream initiation information includes a stream start time;
   receiving the stream of encoded media in each of the plurality of playback devices wherein the stream includes a plurality of frames of the encoded content;
   adjusting the presentation time information of each of the plurality of frames of the stream in each of the plurality of playback devices based upon the stream initiation information and time information from the playback clock in each of the plurality of playback devices; and
   presenting each of the plurality of frames using each of the plurality of playback devices based upon the adjusted presentation time information in each of the plurality of playback devices such that there is no noticeable delay of the presentation of each of the plurality of frames by the plurality of playback devices in the local network.

2. The method of claim 1 wherein the network time provider is a Network Time Protocol Server and the transmitting of the request and receiving of the time information are performed using Network Time Protocol.

3. The method of claim 1 wherein the time information is provided in Coordinated Universal Time.

4. The method of claim 1 wherein the start time is provided in Coordinated Universal Time.

5. The method of claim 1 wherein the network time provider is a local time server.

6. The method of claim 5 further comprising:
   transmitting a request for time information from the local time server to a Network Time Protocol server;
   receiving the time information from the Network Time Protocol server in the local time server;
   receiving the request for time information from the playback device;
   generating the time information for the playback device from the timing information received from the Network Time Protocol server;
   transmitting the time information to each of the plurality of playback devices.

7. The method of claim 1 further comprising:
   transmitting a request for time information from the stream media provider to a Network Time Protocol server;
   receiving the time information from the Network Time Protocol server in the local time server;
   generating the stream initiation information for the stream of encoded media using the time information received by the stream media provider wherein the stream initiation information includes the stream start time;
   receiving a request for the encoded playback from each of the plurality of playback devices by the stream media provider;
   transmitting the stream initiation information includes the stream start time from the stream media provider to each of the plurality of playback devices; and
   transmitting the stream of encoded media from the stream media provider to each of the plurality of playback devices.

8. A system of playback devices for providing synchronous playback of encoded media based on a provided start time comprising:
   a local network;
   a network time provider in the local network; and
   a plurality of playback devices connected to the local network;
   wherein each of the plurality of playback devices comprises:
      memory; and
      a processor configured via a client application stored in the memory to:
      transmit a request for time information to the network time provider,
      receive the time information from the network time provider wherein the time information is provided to each of the plurality of playback devices in the local network,
      set a playback clock using the received time information such that a time delay between the playback clock in each of the playback devices is less than tens of milliseconds so that delay between the playback of the same media content on the plurality of playback devices in the local network is not noticeable by a human,
      receive stream initiation information for a stream of encoded media from a stream media provider wherein the stream initiation information includes a stream start time,
      receive the stream of encoded media wherein the stream includes a plurality of frames of the encoded content,
      adjust presentation time information of each of the plurality of frames of the stream in the playback device based upon the stream initiation information and time information from the playback clock; and
      present each of the plurality of frames using the adjusted presentation time information such that there is no noticeable delay of the presentation of each of the plurality of frames by the plurality of playback devices in the local network.

9. The system of claim 8 wherein the network time provider is a Network Time Protocol Server and the transmitting of the request and receiving of the time information are performed using Network Time Protocol.

10. The system of claim 8 wherein the time information is provided in Coordinated Universal Time.

11. The system of claim 8 wherein the start time is provided in Coordinated Universal Time.

12. The system of claim 8 wherein the network time provider is a local time server.

13. The system of claim 12 wherein the time information provided by the local time server is based on time information from a Network Time Protocol Server.

* * * * *